United States Patent
Normand, Jr.

(10) Patent No.: US 9,260,086 B1
(45) Date of Patent: Feb. 16, 2016

(54) VEHICLE CLEANING SYSTEM

(76) Inventor: Louis J. Normand, Jr., Destin, FL (US)

( * ) Notice: Subject to any disclaimer, the term of this patent is extended or adjusted under 35 U.S.C. 154(b) by 853 days.

(21) Appl. No.: 13/540,642

(22) Filed: Jul. 3, 2012

(51) Int. Cl.
  *B60S 3/04* (2006.01)
(52) U.S. Cl.
  CPC .................................... *B60S 3/04* (2013.01)
(58) Field of Classification Search
  CPC ............................................. B60S 3/04
  See application file for complete search history.

(56) References Cited

U.S. PATENT DOCUMENTS

| | | | | |
|---|---|---|---|---|
| 3,337,896 | A * | 8/1967 | Allen | 15/302 |
| 4,392,820 | A * | 7/1983 | Niederholtmeyer | 431/284 |
| 6,655,396 | B2 * | 12/2003 | Krenzel | 134/104.1 |

* cited by examiner

*Primary Examiner* — Jason Ko
(74) *Attorney, Agent, or Firm* — Salter & Michaelson

(57) ABSTRACT

A system for cleaning vehicles that includes at least one drain beneath the vehicle for collecting spent water used in the cleaning of the vehicle; at least one filter for filtering the spent water; a storage tank for receiving and storing the filtered water; a boiler for receiving water from the storage tank, said boiler heating the water so as to produce steam that is useable in cleaning the vehicle; and an oil recovery apparatus for receiving oil from the vehicle and re-claiming the vehicle oil in order to operate the boiler.

20 Claims, 7 Drawing Sheets

VEHICLE CLEANING SYSTEM

FIELD OF THE INVENTION

The present invention relates very generally to a cleaning system for vehicles. More particularly, the present invention relates to a system for cleaning and washing trucks. Even more particularly, the present invention relates to a cleaning and washing system that is environmentally acceptable.

BACKGROUND OF THE INVENTION

There may be no greater assault on the environment than that which is delivered by a commercial truck wash. Each day hundreds of truck washes across America spew tens of thousands of gallons of toxic water into storm sewers, retention ponds, rivers, lakes and dwindling sources of fresh water. In an age of wide-spread water shortages, water conservation and pollution control are growing concerns in cities across the country. Polluted by road grime, degreasers, road salts, detergents and any number of environmentally toxic chemicals, the waste water generated by truck washes has become a high priority target for new city ordinances and regulations.

The typical truck car wash relies upon the use of degreasers and detergents in order to clean the truck. However, this can provide a significant pollution problem, in addition to the problem of materials that are already existing on the truck and that is washed therefrom.

Accordingly, it is an object of the present invention to provide an improved system for washing vehicles and in particular, for washing and cleaning commercial trucks.

Another object of the present invention is to provide a truck cleaning and washing facility that not only readily cleans the vehicle but also provides a clean environment.

Still another object of the present invention is to provide a truck cleaning and washing station that does not use any chemicals for the cleaning and washing process and that furthermore recycles and conserves virtually all of the water used during the cleaning process.

A further object of the present invention is to provide a truck washing and cleaning facility wherein any road toxins or other materials deposited on the truck can be washed away and thus rid of in the environment once and for all.

Still a further object of the present invention is to provide a closed loop zero discharge filtration system that operates first by utilizing steam to clean the truck in association with a system for reclaiming and filtering the water so that it can be used over and over again.

A further object of the present invention is to provide a truck cleaning and washing facility that may be operated in conjunction with a large capacity retention pond to provide a potential main water supply for the truck wash boiler.

Still a further object of the present invention is to provide a truck wash and cleaning facility in which a boiler is used to create steam associated with a manifold arrangement for washing the trucks with wash guns.

SUMMARY OF THE INVENTION

To accomplish the foregoing and other objects, features and advantages of the present invention there is provided a system for cleaning vehicles, comprising: at least one drain beneath the vehicle for collecting spent water used in the cleaning of the vehicle; at least one filter for filtering the spent water; a storage tank for receiving and storing the filtered water; a boiler for receiving water from the storage tank, said boiler heating the water so as to produce steam that is useable in cleaning the vehicle and an oil recovery apparatus for receiving oil from the vehicle and re-claiming the vehicle oil in order to operate the boiler.

In accordance with other aspects of the present invention including a pair of separately disposed drains that extend at least the length of the vehicle; including a grate over each drain; each drain includes an elongated channel, and the filter for spent water includes a plurality of basket filters spaced apart; including a debris collection chamber for collecting spent debris from the filter; including a separator disposed between the storage tank and boiler; the separator is an oil/water separator, and further including a fresh water holding tank coupled from the separator; including a water feed control apparatus coupled from the holding tank and also receiving condensed steam from the boiler; including a pressure pump for forcing the water from the water feed control apparatus to the boiler; the separator has its own on-board pump; including a burner for heating the boiler; including a propane line, and wherein the burner receives both propane from the propane line and oil from the oil recovery apparatus; including a manifold coupled from the boiler and for receiving generated steam from the boiler; the boiler operates at temperatures up to 240 degree F., and further including wash guns coupled to the manifold and used for cleaning the vehicle; including a blow down separator coupled from the boiler to vent excess steam into the atmosphere so as to maintain save operating pressures; and the oil recovery apparatus includes an oil storage tank, at least one filter and a heat exchanger for heating and thinning the oil for use by the boiler.

In accordance with another embodiment of the present invention there is provided a method of cleaning vehicles, comprising: draining spent water used in the cleaning of the vehicle; filtering the spent water; storing the spent water in a storage tank for receiving and storing the filtered water; heating the water from the storage tank so as to produce steam that is useable in cleaning the vehicle; and recovering oil from the vehicle and re-claiming the vehicle oil in order to provide the heating step. Other aspects of the invention include collecting debris from the filtering; separating any oil from the water prior to heating; and mixing propane with the recovered oil to provide the heating in a boiler.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
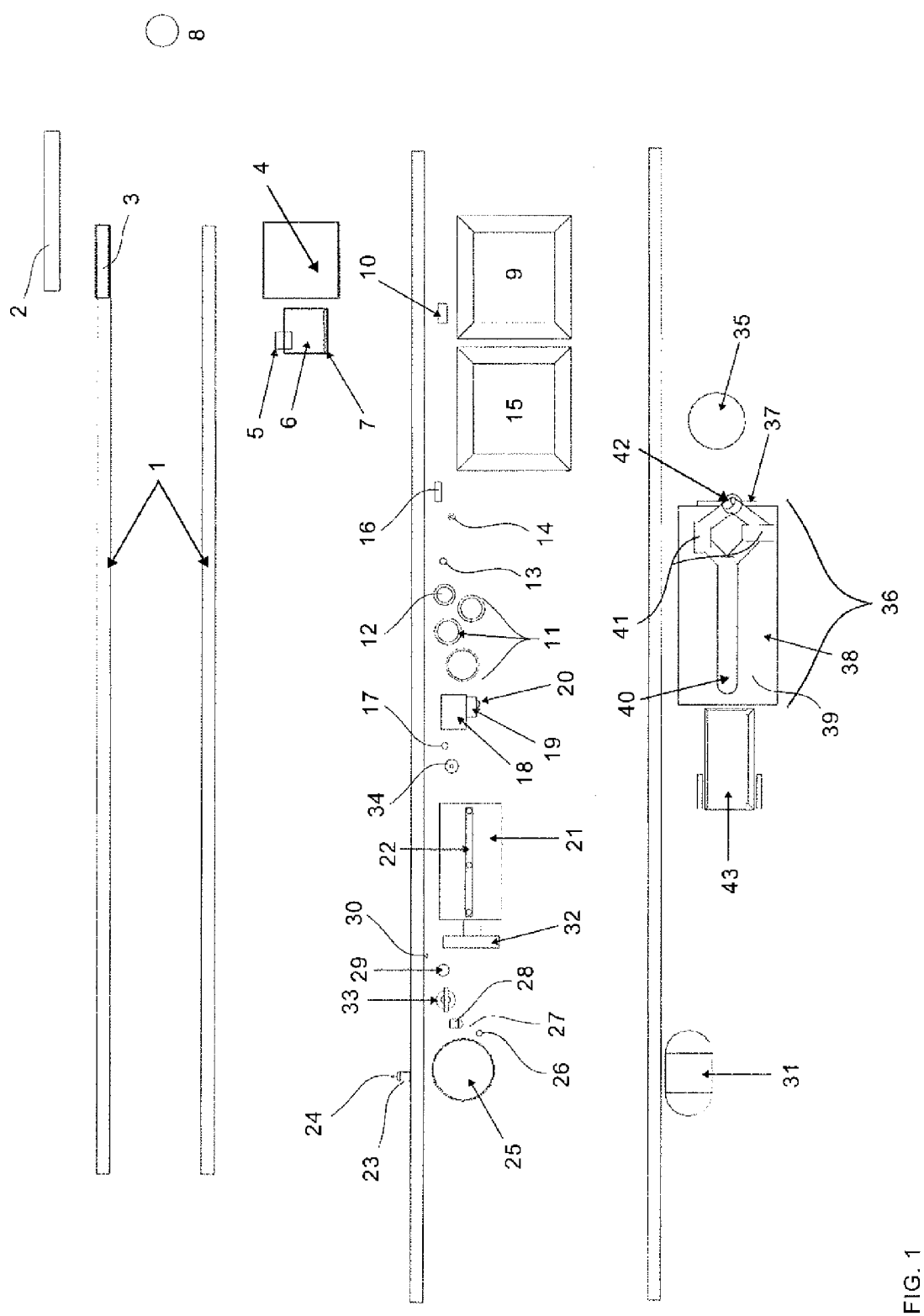
FIG. 1 is a top-down over view diagram of the main components used in the process of the present invention.

Now, in accordance with the truck washing and cleaning process and apparatus of the present invention, one of the basic tenants of the system is that no chemicals are to be used to clean the trucks. Moreover, the system provides for a recycling and conservation of as much used water as possible. Also, the system provides for a capture of any solid road toxins that are harvested during the truck washing process so as to rid the environment of these toxins. The system described herein may be considered as a closed loop zero discharge filtration system that operates primarily on the generation of steam to clean the trucks. Utilizing steam eliminates the need to use detergents and chemicals. Because no chemicals or detergents are used, there is no pollution to clean up. Furthermore, in order to conserve water, when the steam condenses and rinses away road grime, it is to be reclaimed and filtered in order to be re-used over and over again in the washing and cleaning process.

Also, in accordance with one version of the present invention, one arrangement eliminates the need for any city water to be used for truck washing purposes. This would be particularly important in areas of the country such as California or Arizona where water shortages are a growing concern. Thus, in accordance with one practice of the present invention, there is provided a significant size retention pond. The retention pond may be a million gallons of water or more. The retention pond can serve multiple purposes. It provides the means to harvest rain water, it collects run off from the surrounding site and it serves as a potential main water supply for the truck wash boilers that creates the steam to wash the trucks as in accordance with the present invention. Because of the multiple uses the water from the pond may have to serve, the water in the pond needs to be kept pristinely clean. Not the least of those uses is clean water from the boilers. Pumped polluted water into the boiler could clog pipes and valves, destroy the boilers and quickly wipe out profitability due to soaring maintenance costs. Accordingly, the system of the present invention maintains a water tank or water pond wherein the water is essentially drinkable.

Again, the fact that no chemicals are used in the cleaning and washing process of the present invention is significant. This is accomplished for the most part by the use of steam in the cleaning process without the use of any chemicals or detergents. In one actual facility, a retention pond was used and the cleanliness of the water was to a point where it is drinkable and can sustain aquatic life.

Another aspect of the present invention is that the process and system that is described in the figures offers an economical, an ecominded approach to offering customers a vehicle wash and oil change service facility all in one. The system of the present invention filters the water derived from the usage of steam guns so that the captured water is at a virus level of 0.02 microns or less. The filtered water is then heated aiming for total eradication of all viruses and bacteria, pumped into a boiler heated in part by filtered, used motor oil drained from the very vehicle that is being washed. This creates steam to power the wash guns used at the facility. Thus, in accordance with the process and system of the present invention, when a truck is being serviced, it is being washed and cleaned at the same time that the motor oil in the engine is being replaced. Thus, the system of the present invention not only recovers used motor oil, used for operating a boiler, but also cleans the water generated from the steam cleaning process. The result is saving thousands upon thousands of dollars of the cost of operations of a truck wash with the most minimal detrimental environmental impact. Steam created in the process can be used to heat the facility and even aid in generating energy by the use of turbines. Water filtered and disinfected in the process is certifiably drinkable.

Figure 5:
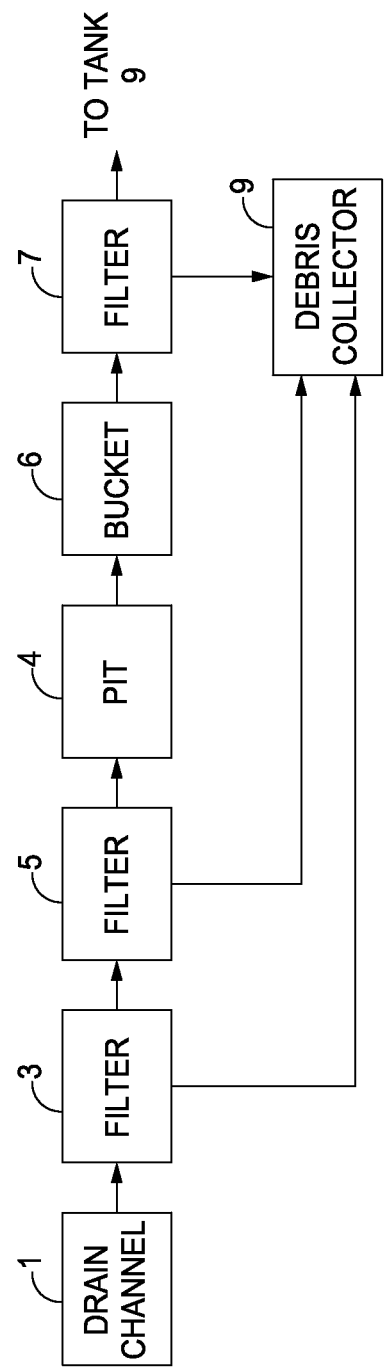
FIG. 5 is a first block diagram related to the initial water collection.

The system of the present invention begins its filtration process by collecting the run off water from trucks into drain channels 1. In this regard refer to FIGS. 1, 2 and 5. As schematically illustrated, there are a pair of drain channels that run longitudinally, two for each truck bay. Each of these channels may be, for example, 12 inches deep. Each of the channels 1 has a removable, sectional grating 2 and three fiberglass mesh basket filters 3. Each of the filters 3 may be about 10 inches long and disposed along the terminal end of a channel. The water is fed by gravity and the filters that are used clean the runoff water or oil and particulate matter to a 30.00 micron level.

The drain channels are disposed so that the water gravity feeds through a heavy duty 30 mm nylon stocking filter 5 and then into the solid capture pit 4. The capture pit 4 contains a removable metal-framed basket 6 that is provided with cotton fabric filters 7. The fiberglass mesh basket filters 3, the stocking 6 and the cotton fabric filter 7 are preferably cleaned once per operating day by staff at the facility. These filter elements are cleaned by spraying out trapped debris into the temporary debris collection chamber 8. The aforementioned components are illustrated individually in FIGS. 1 and 2. The connection between the recited components is depicted in the block and flow diagram of FIG. 5.

Figure 2:
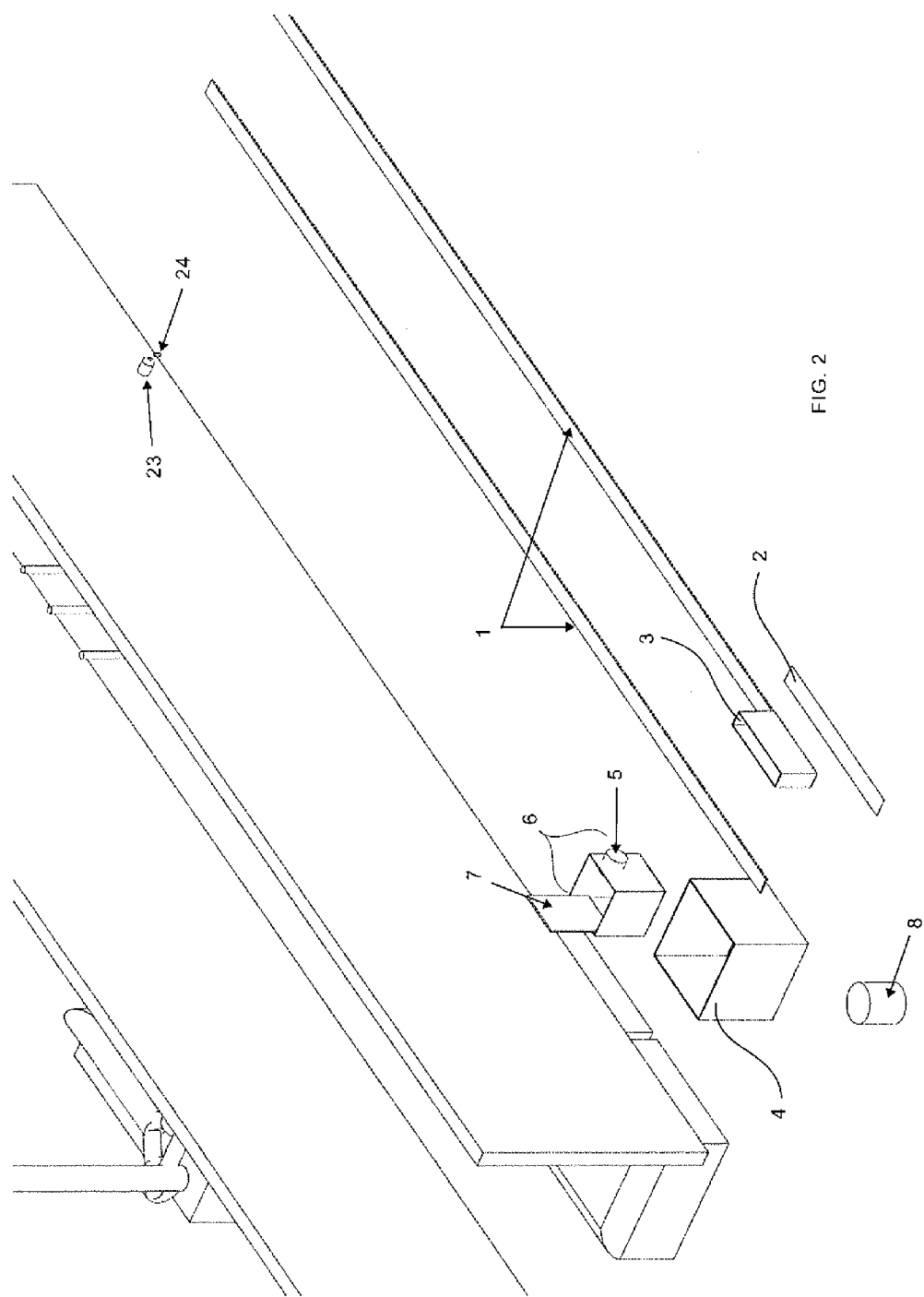
FIG. 2 is a schematic perspective of part of the system depicted in FIG. 1 including the initial water collection.
Figure 3:
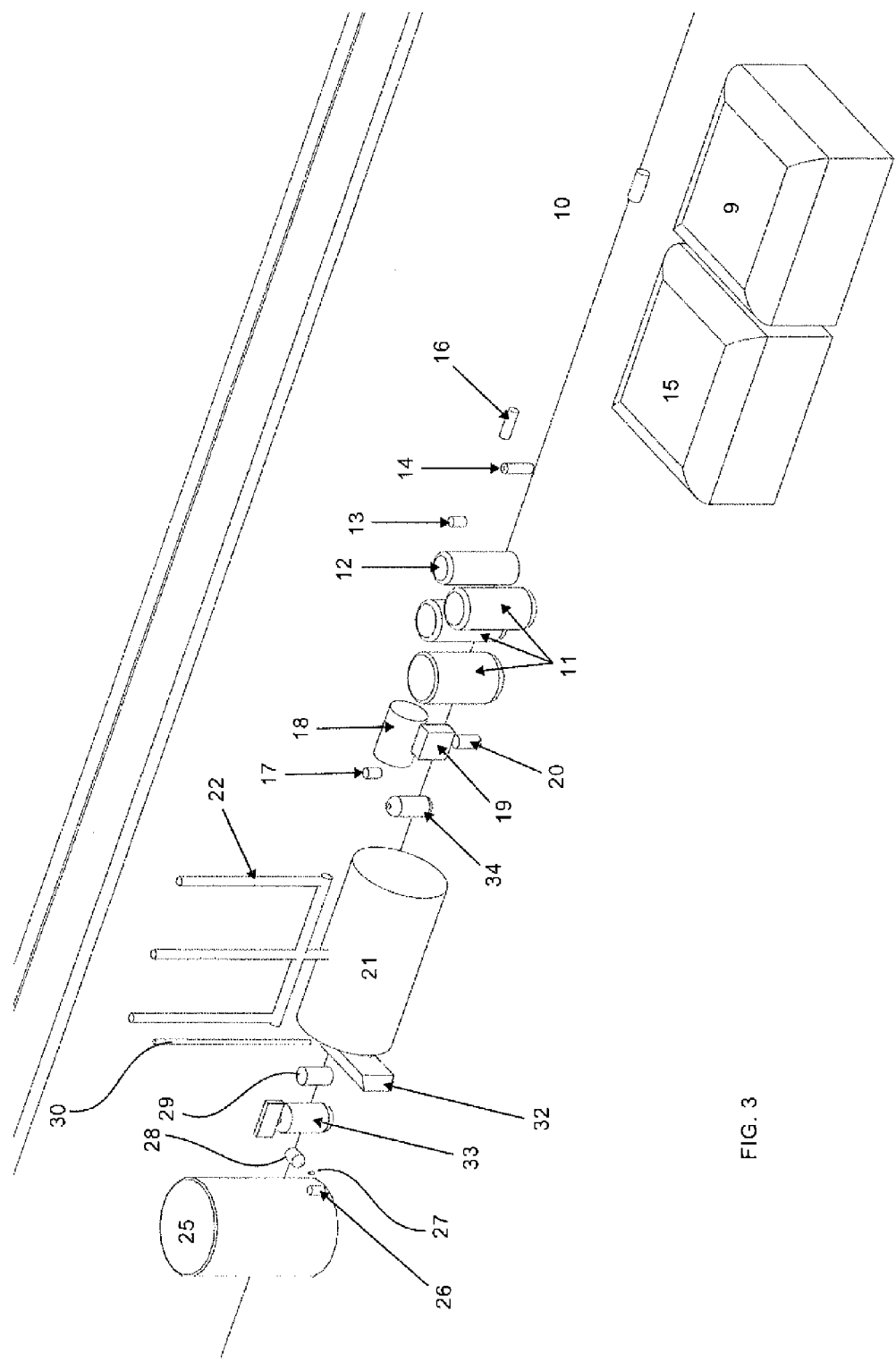
FIG. 3 is a schematic perspective of components illustrated in FIG. 1 particularly for the steam/filtration room.
Figure 6:
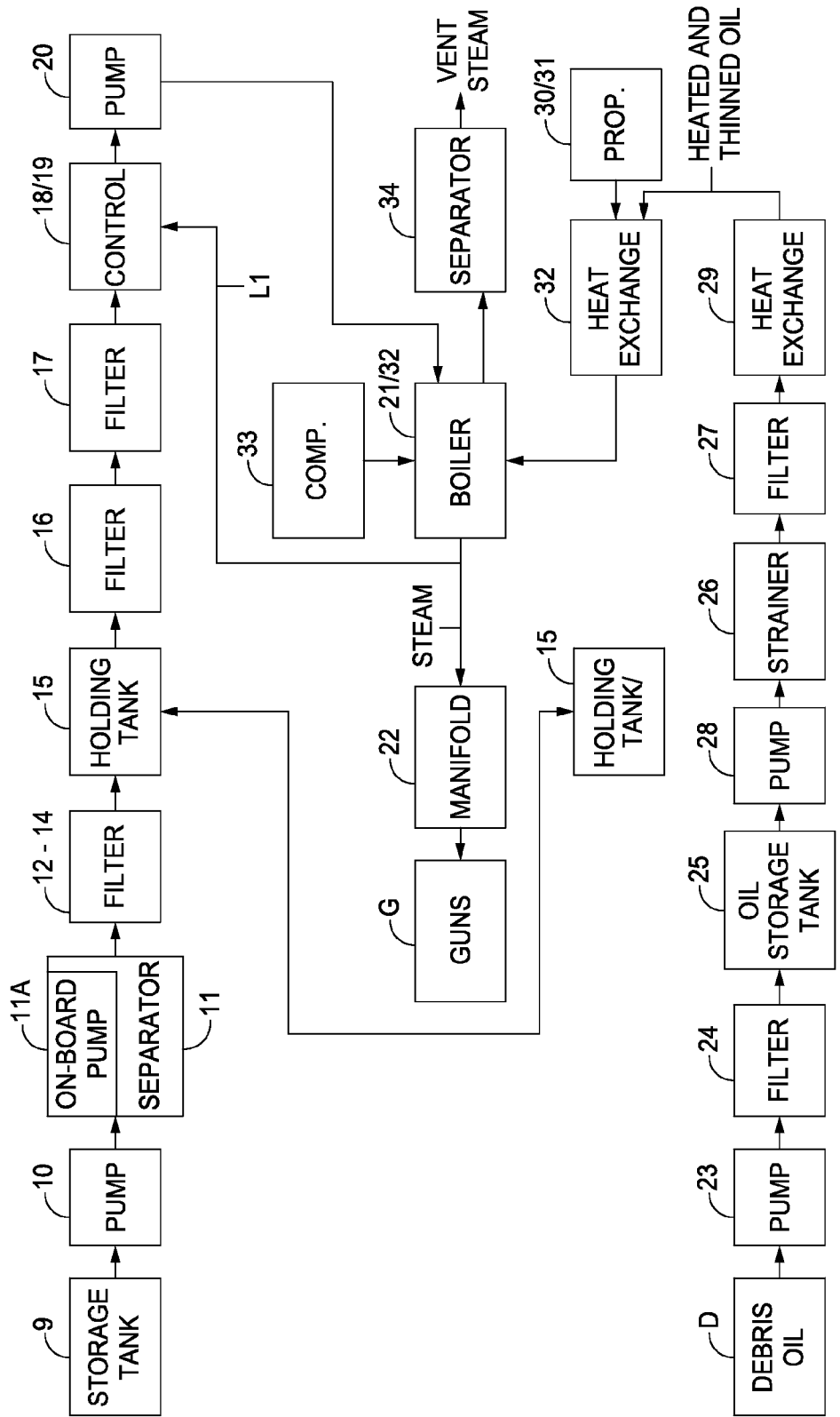
FIG. 6 is a further block and flow diagram illustrating the water processing as well as the oil recovery.

Reference is now made to FIGS. 1, 3 and 6 for further discussions relating to the system of the present invention. The filtered water passes into a one thousand gallon waste storage tank 9 from which it is sucked by a Gould water pump, J15S into an oil and water separator. The block diagram of FIG. 6 illustrates the storage tank 9 and the pump 10. The separator 11 may be a commercially available oil/water separator that is used for offshore oil platforms such as provided by Recovery Energy, Inc. The separator 11 preferably also has its own onboard pump 11A. The separator 11 recycles the water through sand media filtration tanks multiple times until the contamination level tests at less than or equal to 0.06 microns. For this purpose an onboard monitoring system maybe used. Once the water leaves the separator 11, it is pumped into a commercially available Waterboy 7000 filter 12. This removes carcinogens and volatile organic compounds. The filtered and disinfected water then passes through a further filter 13 into a terminal dense net filter 14 and from there passes into the fresh water holding tank 15. The filter 13 may be a GE filter designated by GXWH40L.

As also illustrated in the flow block diagram of FIG. 6, from the holding tank 15, there is provided a second Gould water pump 16 designated as their pump J15S which draws water from the holding tank 15 to a further filter 17 which may be of the type previously described. From the filter 17, the water enters a feed water system 18. The feed water system 18 may be one by Hurst. As also indicated in FIG. 6, associated with the control block 18/19 is a line L1 coupled from the boiler output. The system 18 is also responsible for condensing excess steam from the system. Thus, at the control 18 the cleaned water combines with the condensing steam returning from the boiler to reach over 240 degrees F. eradicating all viruses and bacteria. The pressurized water is regulated by the control mechanism 19 associated with the apparatus 18. FIG. 6 also illustrates the pump 20 at the output of the device 18 which couples the water into the commercially available Hurst boiler 21 where it is heated. The resultant steam is piped into the boiler manifold 22 where it is directed to wash guns G in the drive bay facility.

With further reference to FIGS. 1, 3 and 6, there is disclosed boiler 21. As indicated previously, this may be a conventional Hurst boiler. The boiler 21 is heated from the burner 32 which may be a Power Flame Burner Model C3-GO-20. The boiler and burner are thus fueled in part from the used dirty oil that is drained from the customer's vehicle while at the facility. Thus, the system of the present invention takes advantage of, not only the use of steam in cleaning and the recovery of water, but also at the same time uses the drained oil from the truck, reprocessed and thinned for feeding to the burner and boiler.

As indicated in the flow block diagram of FIG. 6, the dirty oil is depicted at block D. The oil is pumped by oil pump 23 through the filter 24. The filter 24 may be a caterpillar-type filter. From there the filtered oil is stored in the oil storage tank 25. From there, the oil is pulled by oil pump 28 through a strainer 26 and filtered by secondary commercially available heavy duty truck filter 27. This filtered, used oil is heated by a modified commercially available heat exchanger 29. The heat exchanger 29 provides for a thinning of the viscosity of the oil so it can be burned effectively in the burner 32. As illustrated in the flow block diagram of FIG. 6, at this point the heated, thinned oil is combined with propane from the propane line 30. The propane line 30 connects to an exterior propane tank 31. The flow block diagram of FIG. 6 illustrates both the oil and propane lines coupling to the burner 32. This heats the boiler, containing the clarified, sanitized water into steam which is channeled into the manifold 22. The flow block diagram of FIG. 6 also illustrates an air compressor 33 which may be a commercially available Ingersoll Rand electric-driven single stage air compressor. The compressor 33 is used to blow debris out of the burner prior to each ignition and after each ignition. Excess steam in the system is recycled as explained previously in connection with the control 18. Directly attached to the boiler 21 is a Hurst blow down separator 34 also illustrated in the flow block diagram of FIG. 6 to vent excess steam into the atmosphere to maintain safe operating pressures.

Figure 4:
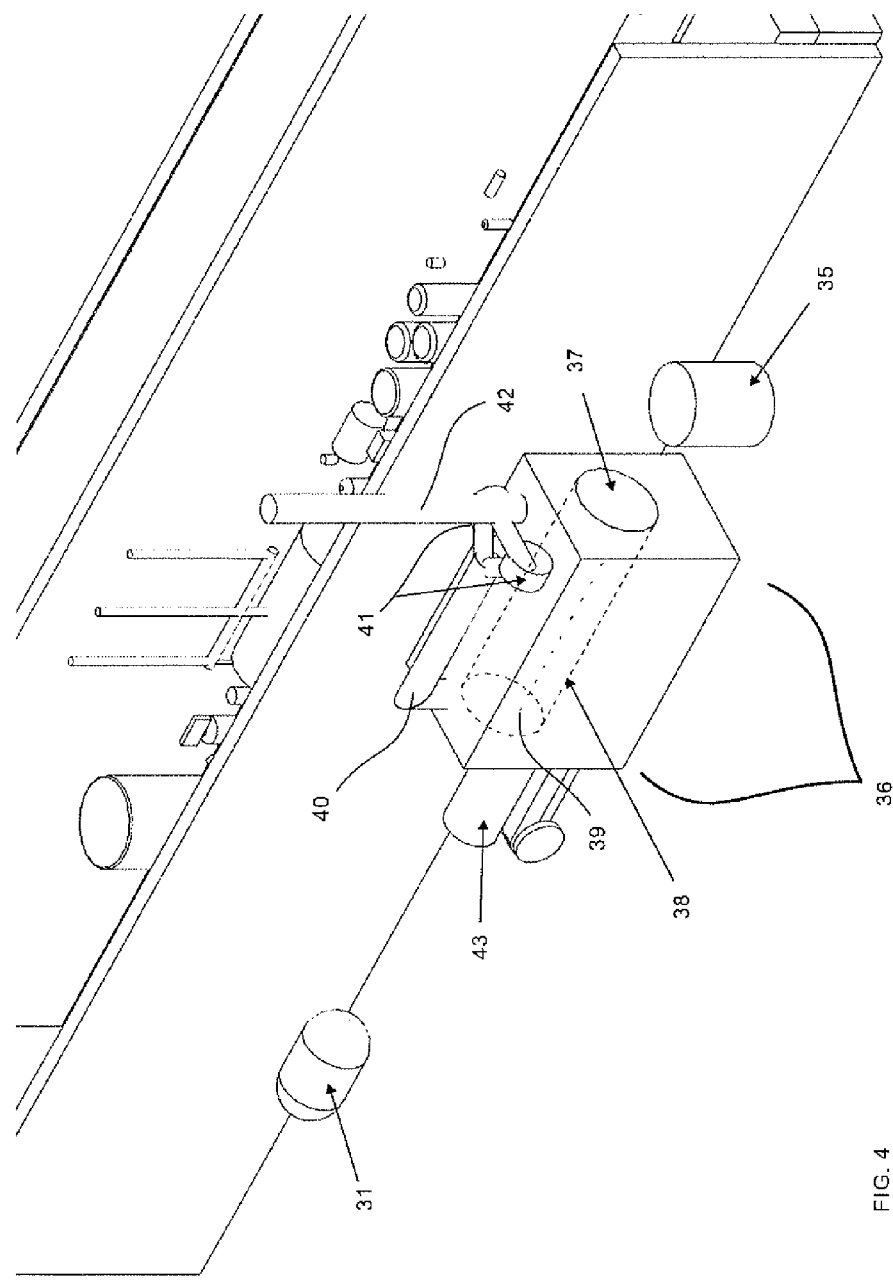
FIG. 4 is a schematic perspective further illustrating the incinerator portion used in the process of the present invention.
Figure 7:
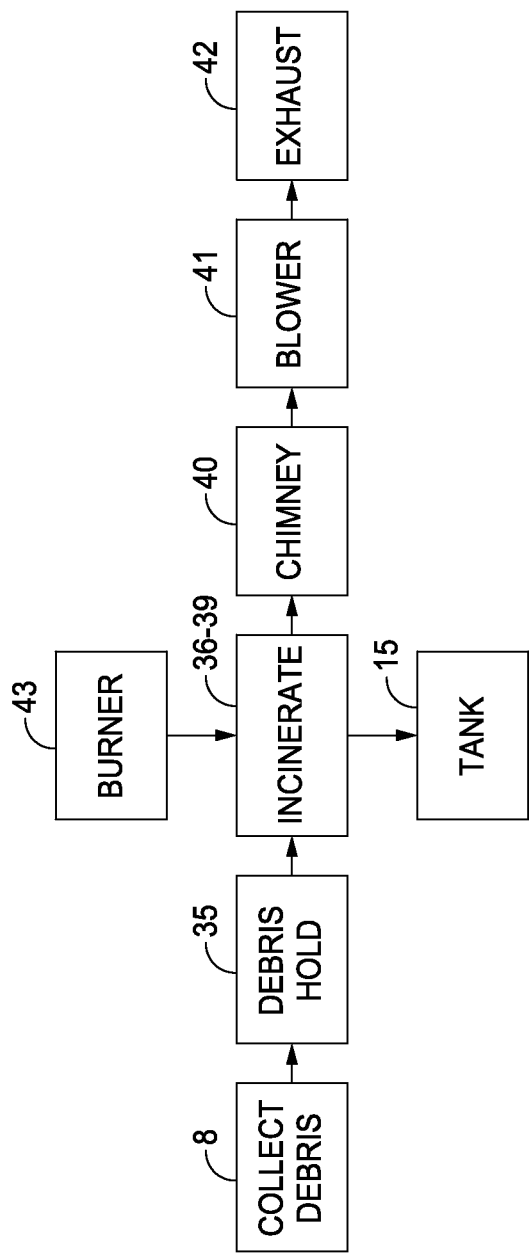
FIG. 7 is a flow and block diagram related to the debris collection aspect of the process of the present invention.

Reference is now made to FIGS. 1, 4 and 7 in connection with the handling of debris and other toxins collected during the operation of the process and system of the present invention. In this regard, mention is made of the temporary debris collection chamber 8. This chamber 8 is emptied occasionally into the debris hold 35 to await disposal by incineration in an earth insulated incinerator 36. The incinerator 36 is comprised of an entry lid 37 which opens to a chamber 38 where debris is deposited. The chamber 38 features interior spouts 39 fed water from the fresh water tank 15. This process weighs down particulate matter as it is generated by the heat to achieve a maximum burn of the debris and insure a clean venting into the chimney 40. The chimney 40 has associated therewith at least one blower 41 for coupling to the incinerator exhaust 42. The heat for the incinerator is produced by a commercially available burner 43 fed by the propane tank 31 that also in part fuels the boiler burner 32.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A system for cleaning vehicles, comprising:
   at least one drain beneath the vehicle for collecting spent water used in the cleaning of the vehicle;
   said at least one drain including an elongated channel;
   at least one filter for filtering the spent water from the elongated channel;
   a debris collection chamber for collecting spent debris;
   a water storage tank for receiving and storing the filtered water from the at least one filter;
   a boiler for receiving water from and coupled to the storage tank, said boiler heating the water so as to produce steam that is useable in cleaning the vehicle;
   a burner for operating the boiler;
   a manifold coupled from the boiler and for receiving generated steam from the boiler;
   at least one wash gun coupled from the manifold and used for cleaning the vehicle;
   an oil recovery apparatus for receiving oil from the vehicle and re-claiming the vehicle oil in order to operate the boiler;
   said oil recovery apparatus including the reclaimed vehicle oil from the vehicle, a recovered oil filter, and an oil storage tank;
   a source of propane;
   said burner constructed and arranged with respective inputs so as to operate the boiler from both the source of propane and the reclaimed oil from the oil storage tank;
   and an incinerator coupled from the debris collection chamber to provide a clean venting into a chimney.

2. The system of claim 1 including a pair of separately disposed drains that extend at least the length of the vehicle.

3. The system of claim 2 including a grate over each drain.

4. The system of claim 3 wherein the filter for spent water includes a plurality of basket filters spaced apart.

5. The system of claim 1 including a second burner for operating the incinerator, said second burner supplied from the source of propane.

6. The system of claim 1 including a separator disposed between the storage tank and boiler.

7. The system of claim 6 wherein the separator is an oil/water separator, and further including a fresh water holding tank coupled from the separator.

8. The system of claim 7 including a water feed control apparatus coupled from the holding tank and including a feedback control mechanism for receiving condensed steam from the boiler.

9. The system of claim 8 including a pressure pump downstream of said feedback control mechanism for forcing the water from the water feed control apparatus to the boiler.

10. The system of claim 9 including a feedback control line from an output of the boiler to a control input of the feedback control mechanism for condensing excess steam generated from the boiler.

11. The system of claim 10 including a second burner for operating the incinerator, said second burner supplied from the source of propane.

12. The system of claim 11 wherein said oil recovery apparatus further includes an oil recovery pump coupled from the oil storage tank, a strainer coupled from the oil storage tank, and a heat exchanger coupled from the strainer.

13. The system of claim 1 including a separator disposed between the storage tank and boiler, a fresh water holding tank coupled from the separator, and wherein the heat exchanger provides for a thinning of the viscosity of the reclaimed oil for delivery to the burner, along with delivery of propane from the source of propane so that alternate energy sources are available to operate the boiler.

14. The system of claim 13 wherein the boiler operates at temperatures up to 240 degree F. and including a water feed control apparatus coupled from the fresh water holding tank and including a feedback control mechanism for receiving condensed steam from the boiler, a pressure pump downstream of said feedback control mechanism for forcing the water from the water feedback control apparatus to the boiler, and a feedback control line from an output of the boiler to a control input of the feedback control mechanism for condensing excess steam generated from the boiler.

15. The system of claim 14 including a blow down separator coupled from the boiler to vent excess steam into the atmosphere so as to maintain safe operating pressures.

16. The system of claim 14 including an air compressor that is used to blow debris out of the burner prior to each ignition and after each ignition.

17. The system of claim 1 wherein said oil recovery apparatus further includes a first pump for pumping the recovered oil from the drain, a second pump coupled from the oil storage tank, a strainer coupled from the oil storage tank, and a heat exchanger coupled from the strainer.

18. The system of claim 17 wherein the heat exchanger provides for a thinning of the viscosity of the reclaimed oil for delivery to the burner, along with delivery of propane from the source of propane so that alternate energy sources of respective recovered oil and propane are available to operate the boiler.

19. The system of claim 18 wherein the boiler operates at temperatures up to 240 degree F., and including a water feed control apparatus coupled from the fresh water holding tank and including a feedback control mechanism for receiving condensed steam from the boiler, a pressure pump downstream of said feedback control mechanism for forcing the water from the water feedback control apparatus to the boiler, and a feedback control line from an output of the boiler to a control input of the feedback control mechanism for condensing excess steam generated from the boiler.

20. The system of claim 19 including a blow down separator coupled from the boiler to vent excess steam into the atmosphere so as to maintain safe operating pressures, and an air compressor that is used to blow debris out of the burner prior to each ignition and after each ignition.

* * * * *